United States Patent
Burgel et al.

(10) Patent No.: US 10,239,787 B2
(45) Date of Patent: Mar. 26, 2019

(54) RESIN MIXTURE, REACTION RESIN—MORTAR, MULTI-COMPONENT MORTAR SYSTEM, AND THEIR APPLICATION

(71) Applicant: Hilti Aktiengesellschaft, Liechtenstein (LI)

(72) Inventors: Thomas Burgel, Landsberg (DE); Monika Monch, Landsberg/Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 95 days.

(21) Appl. No.: 15/003,105

(22) Filed: Jan. 21, 2016

(65) Prior Publication Data

US 2016/0159689 A1 Jun. 9, 2016

Related U.S. Application Data

(63) Continuation of application No. PCT/EP2014/065799, filed on Jul. 23, 2014.

(30) Foreign Application Priority Data

Jul. 24, 2013 (EP) ..................... 13177783

(51) Int. Cl.
  *C04B 26/06* (2006.01)
  *E21B 33/13* (2006.01)
  *C04B 24/00* (2006.01)
  *C04B 111/00* (2006.01)

(52) U.S. Cl.
  CPC ............ *C04B 24/008* (2013.01); *C04B 26/06* (2013.01); *E21B 33/13* (2013.01); *C04B 2111/00715* (2013.01)

(58) Field of Classification Search
  CPC ... C04B 26/06; C04B 24/008; C04B 40/0666; C04B 2111/00715; C08F 2222/1013; C08F 2222/1086; E21B 33/13
  USPC ....................................... 156/327
  See application file for complete search history.

(56) References Cited

U.S. PATENT DOCUMENTS

| | | | |
|---|---|---|---|
| 5,436,396 A | 7/1995 | Bailey et al. | |
| 5,854,305 A * | 12/1998 | Schwiegk | C04B 40/0666 106/608 |
| 6,533,503 B2 | 3/2003 | Pfeil et al. | |
| 2001/0018880 A1 | 9/2001 | Pfeil et al. | |
| 2004/0092656 A1 | 5/2004 | Vogel et al. | |
| 2006/0045630 A1 | 3/2006 | Buerger et al. | |
| 2008/0171807 A1 | 7/2008 | Kumuru et al. | |
| 2010/0029859 A1* | 2/2010 | Jansen | C04B 26/16 525/360 |
| 2011/0073327 A1* | 3/2011 | Buergel | C04B 26/04 166/382 |

FOREIGN PATENT DOCUMENTS

| | | |
|---|---|---|
| CN | 101265052 A | 9/2008 |
| DE | 69314793 | 2/1998 |
| DE | 2000102367 | 7/2001 |
| DE | 102004035567 | 10/2006 |
| DE | 102009043792 | 3/2011 |
| DE | 102010051818 B3 | 2/2012 |
| EP | 0761792 A2 | 3/1997 |
| EP | 1619174 A2 | 1/2006 |
| EP | 1935860 | 4/2012 |
| JP | H09143380 | 6/1997 |
| JP | 2001-151832 | 6/2001 |
| JP | 2007-197730 | 8/2007 |
| JP | 2007-224264 | 9/2007 |
| JP | 2011-137141 | 7/2011 |
| JP | 2012-233036 | 11/2012 |
| RU | 2109922 | 4/1998 |
| RU | 2000132388 A1 | 10/2002 |
| RU | 2003131684 A | 1/2005 |
| WO | 2001/014438 | 3/2001 |
| WO | 2010/108939 | 9/2010 |

* cited by examiner

*Primary Examiner* — Kelechi C Egwim

(74) *Attorney, Agent, or Firm* — Grüneberg and Myers PLLC

(57) ABSTRACT

A resin mixture is described, comprising at least one compound that can be radically polymerized, at least one reactive diluent selected from 1,3-dicarbonyl compounds, and at least one polymerization inhibitor, selected from stable N-oxyl-radicals or 4-hydroxy-3,5-di-tert-butyl toluene, with the molar ratio of at least one 1,3-dicarbonyl compound and the polymerization inhibitor ranging from 30:1 to 150:1, a reaction resin mortar comprising said resin mixture, a two-component or multi-component system, as well as the use for construction purposes, particularly for the chemical fastening in mineral undergrounds.

17 Claims, No Drawings

RESIN MIXTURE, REACTION RESIN—MORTAR, MULTI-COMPONENT MORTAR SYSTEM, AND THEIR APPLICATION

RELATED APPLICATIONS

This application claims priority to, and is a continuation of, International Application No. PCT/EP2014/065799 having an International filing date of Jul. 23, 2014, which is incorporated herein by reference, and which claims priority to European Patent Application No. 13177783.1, having a filing date of Jul. 24, 2013, which is also incorporated herein by reference] in its entirety.

SUMMARY OF THE TECHNOLOGY

The present invention relates to a resin mixture comprising at least one compound that can be radically polymerized, at least one reactive diluent selected from 1,3-dicarbonyl compounds, and at least one polymerization inhibitor, a reaction resin mortar comprising said resin mixture, a two-component or multi-component mortar system comprising the reaction resin mortar, as well as their use for construction purposes, particularly for the chemical fastening.

BACKGROUND OF THE INVENTION

Two-component mortar masses comprising a curable resin component with a content of at least one resin that can be radically polymerized, fillers, accelerants, stabilizers, and optionally additional common mortar components, and a curing component, arranged separated therefrom to inhibit reactions, showing a content of at least one peroxide, and their use for construction purposes are known.

Two-component mortar masses of this type are used for example as injection mortar for the chemical anchoring of fastening elements, preferably metal elements in various undergrounds, preferably mineral undergrounds, such as particularly brick, concrete, or natural stone.

Here, initially the boreholes required for fastening the anchoring means are inserted into the mineral underground, and thereafter the curable resin component is mixed with the curing component of the two-component mortar mass and inserted into the borehole, and thereafter the anchoring means to be fastened is inserted and adjusted and the mortar mass is cured. For this purpose, the applicant distributes injection mortar in the form of rapidly curing systems, which show a hybrid system comprising methacrylate resin, which cures radically, and a hydraulically setting cement, which after processing results in the borehole in an extremely robust plastic.

Commonly, for injection mortars for the chemical anchoring of anchoring elements in boreholes, the mortar mass is either declared a universal mortar or the mortar mass is formulated such that it is particularly adjusted to the respective underground. The declaration as a universal mortar indicates that the mortar mass is suitable for all mineral undergrounds, generally concrete, masonry (solid brick or solid stone walls), hollow walls (cavity blocks or ventilating brick masonry), lightweight or porous concrete and the like, with the load values varying widely for the respective undergrounds. When the mortar mass is adjusted for use in certain undergrounds, this means that the mortar mass is formulated in a targeted fashion for the use in a certain underground, thus optimized, and therefore yields better load values for a respective use. Commercially available examples for a universal use injection mortar are the product Hilti HIT-HY 70 injection mortar and Hilti HFX injection mortar. Hilti HIT-HY 150 MAX for the use in concrete and Hilti HIT-ICE injection mortar for underground temperatures up to −18° C. may be named as examples of specially formulated mortar masses.

It has shown that particularly in solid brick the strength of most mortar masses, particularly universally formulated mortar masses, is limited and largely depends on the temperature of the underground.

During the development of a product not subject to labeling, similar to the mortar mass described in DE 10 2010 051 818 B3, particularly for the use in masonry, it has shown that the polymerization inhibitors, such as pyrocatechol or 4-tert-butyl pyrocatechol (EP 1935860 A1), previously classified as particularly strong, fail to show the expected moderate performance level. With the above-mentioned polymerization inhibitors only very low load values could be yielded, which are insufficient for many applications, particularly those demanding high load values. The strength could not be considerably improved by the use of reactive diluents, particularly known for brick applications, namely hydroxyl alkyl(meth)acrylate, such as hydroxyl propyl methacrylate (DE 10 2004 035 567 A1), or aceto-acetoxy alkyl(meth)acrylate, such as aceto-acetoxy ethyl methacrylate (DE 41 31 457 A1), their combination (DE 10 2004 035 567 B4), or additionally using alkyl(meth)acrylates (DE 10 2009 043 792 A1).

BRIEF SUMMARY OF THE INVENTION

Accordingly there is need for a strong mortar mass for the application in masonry, particularly brick undergrounds, which in the lower strength range (low load values) is not subject to labeling and yet shows better or at least similar load values as the previously available injection mortars and otherwise yields clearly improved load values.

The object of the invention therefore comprises to provide a reaction resin mortar with improved strength for the use in mineral undergrounds, particularly masonry.

The inventors could discover that the selection of the polymerization inhibitor, particularly the inhibitor for adjusting the gel time, and the selection of the reactive diluent are of decisive influence upon the strength, particularly the failure load in brick. However it has shown completely unexpectedly and surprisingly that the objective can be attained when, instead of the pyrocatechol and its derivatives, a free NO-radical or the sterically inhibited phenol 3,5-di-tert-butyl-4-hydroxy toluene (BHT) is used as the polymerization inhibitor and suitable 1,3-dicarbonyl compounds as reactive diluents.

In one embodiment the present resin mixture comprises at least one compound that can be radically polymerized, at least one reactive diluent, which is selected from 1,3-dicarbonyl compounds with the general formula (I)

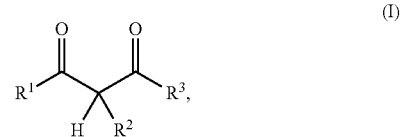

in which $R^1$ represents a straight-chained or branched, perhaps substituted $C_1$-$C_6$-alkyl group, preferably $C_1$-$C_2$-alkyl group;

$R^3$ represents hydrogen or a straight-chained or branched, perhaps substituted $C_1$-$C_6$-alkyl group, a $C_1$-$C_6$-alkoxy group, or a methacryloyloxy group with the formula (II)

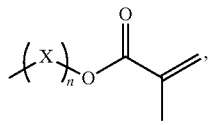
(II)

in which X represents a methylene glycol, ethylene glycol, or propylene glycol group, and n an integer with a value from 1 up to including 6, $R^2$ represents hydrogen, a straight-chained or branched, perhaps substituted $C_1$-$C_6$-alkyl group or a $C_1$-$C_6$-alkoxy group, or together with $R^3$ forms a potentially substituted five or six-link aliphatic ring, which perhaps includes heteroatoms in or at the ring;

or the general formula (Ill)

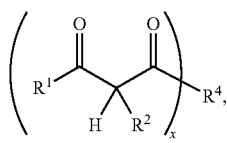
(III)

in which $R^4$ represents a bivalent or polyvalent alcohol, x represents an integer between 1 and 6, and $R^1$ and $R^2$ represent the same substances as defined above and at least one polymerization inhibitor, which is selected from stable N-oxyl-radicals or 4-hydroxy-3,5-di-tert-butyl toluene, with the ratio of at least one 1,3-dicarbonyl compound and the polymerization inhibitor ranging from 30:1 to 150:1.

In one example, the reactive diluent is included in a volume from 1 to 15% by weight and at least one polymerization inhibitor of a volume from 0.005 to 2% by weight. Examples of reactive diluents include acetyl acetone, 2-(aceto-acetoxy)ethyl methacrylate, tri-aceto-acetato-trimethylol-propane, benzyl-aceto-acetate, α-acetyl-γ-butyrol-actone, tert-butyl aceto-acetate, and ethyl aceto-acetate.

Examples of polymerization inhibitors include piperidinyl-N-oxyl-tetrahydropyrrol-N-oxyl, indolin-N-oxyl, β-phosphorylated N-oxyl-radicals, and 4-hydroxy-3,5-di-tert-butyl toluene.

In one examples, the compound that can be radically polymerized represents an unsaturated polyester resin, a vinyl ester resin, a urethane(meth)acrylate resin, and/or an epoxy(meth)acrylate resin.

The resin mixture can further comprise at least one accelerant. The resin mixture can also further comprise additional reactive diluents and/or polymerization inhibitors.

In one examples, the viscosity of the resin mixture ranges from 200 to 800 mPa·s.

The resin mixture can be used in a reaction resin mortar comprising a resin mixture according to the invention and inorganic and/or organic aggregates.

In an embodiment, the reaction resin mortar can contain an inorganic filler as an aggregate, which is selected from the group comprising quartz, sand, pyrogenic silicic acid, corundum, chalk, talcum, ceramic, clay, glass, cement, light spar and/or barite in a suitable distribution of particle sizes or combinations thereof.

In another embodiment, the reaction resin mortar can contain a thickening agent as the aggregate, which is selected from the group comprising pyrogenic silicic acids, sheet silicates, acrylate or polyurethane thickening agents, castor oil derivatives, Neuburg siliceous earth, and xanthan gum or combinations thereof.

The reaction resin mortar of the invention can be used to form a ttwo-component or multi-component mortar system comprising a reaction resin mortar according to the invention and separated therefrom, in a reaction inhibiting fashion, a curer, comprising a curing agent and inorganic and/or organic aggregates.

In one embodiment, the two-component or multi-component mortar system contains a curing agent representing an inorganic or organic peroxide.

In another embodiment, the two-component or multi-component mortar system contains an accelerant being included in a volume from 0.1 to 1.5% by weight, the inhibitors in a volume from 0.003 to 0.35% by weight, and the curing agent in a volume from 0.1 to 3% by weight, each in reference to the total weight of the two-component or multi-component mortar system.

In yet another embodiment, the two-component or multi-component mortar system includes an accelerant being included in a volume from 0.1 to 0.5% by weight, the inhibitor in a volume from 0.003 to 0.07% by weight, and the curing agent in a volume from 0.1 to 0.35% by weight, each in reference to the total weight of the two-component or multi-component system.

The reaction resin mortar or the two-component or multi-component mortar systems can be used for construction purposes such as the chemical fastening of fastening and/or anchoring means in boreholes in mineral undergrounds.

BRIEF DESCRIPTION OF SEVERAL VIEWS OF THE DRAWINGS

[Not Applicable]

DETAILED DESCRIPTION OF THE INVENTION

In order to better understand the invention, at first the following explanations of the terminology used here are considered beneficial. It represents in the sense of the invention:

"resin mixture" a mixture of the reaction mixture of the resin production, comprising the compound which can be radically polymerized, optionally a catalyst for the production of the compound, reactive diluents and accelerants, as well as stabilizers, and optionally additional reactive diluents;

"reaction resin mortar" a mixture of the resin mixture and inorganic aggregates;

"curing agent" substances, which cause the polymerization (the curing) of the base resin;

"hardener" a mixture of the curing agent and organic and/or inorganic aggregates;

"accelerants" a compound capable to accelerate the polymerization reaction (curing), which serves to accelerate the formation of the radical starter;

"polymerization inhibitor" is here also equivalently called "inhibitor" for short, a compound capable to inhibit the polymerization reaction (curing), which serves to prevent the polymerization reaction and thus any undesired premature polymerizing of the compound that can be radically polymerized during storage (frequently called stabilizers), and serves to delay the onset of the polymerization reaction immediately after the addition of the curing agent; in order to achieve the purpose of stable storage the inhibitor is commonly used in such low volumes that the gel time is not influenced; in order to influence the point of time the polymerization reaction starts the inhibitor is commonly used in such volumes that the gel time is influenced;

"reactive diluent" liquid or low-viscous compounds that can be radically polymerized, which dilute the resin mixture and this way provide it with the viscosity necessary for its application, comprising functional groups capable to react with the basic resin, and which during the polymerization (curing) overwhelmingly become a component of the cured mass (mortar);

"mortar mass" the formulation which is yielded by mixing the reaction resin mortar with the hardener, and as such can directly be used for the chemical fastening;

"two component system" a system comprising two components, stored separated from each other, generally a resin and a curing components, so that curing of the reaction resin mortar can only occur after the mixing of the two components;

"multi-component system" a system comprising three or more components, stored separated from each other, so that any curing of the reaction resin mortar can only occur after the mixing of all components;

"gel time" the time of the curing phase of the resin, in which the temperature of the resin increases from +25° C. to +35° C.; this is approximately equivalent to the period in which the fluidity or viscosity of the resin is still at such a range that the reaction resin and/or the reaction resin mass can still be easily handled and/or processed.

"(meth)acryl . . . / . . . (meth)acryl . . . " that both the "methacryl . . . / . . . methacryl . . . "—as well as the "acryl . . . / . . . acryl . . . " compounds shall be included, here.

The inventors have surprisingly discovered that the strength of the mortar mass can be considerably increased with a combination of certain reactive diluents and certain polymerization inhibitors.

A first objective of the invention is therefore a resin mixture comprising at least one compound that can be radically polymerized, at least one reactive diluent, and at least one inhibitor.

According to the invention, the reactive diluent is selected from 1,3-dicarbonyl compounds with the general formula (I)

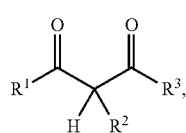

in which $R^1$ represents a straight-chained or branched, optionally substituted $C_1$-$C_6$-alkyl group, preferably $C_1$-$C_2$-alkyl group;

$R^3$ hydrogen or a straight-chained or branched, optionally substituted $C_1$-$C_6$-alkyl group, preferably $C_1$-$C_2$-alkyl group or a $C_1$-$C_6$-alkoxy group, preferably $C_1$-$C_2$-alkoxy group, or a methacryloyloxy group with the formula (II)

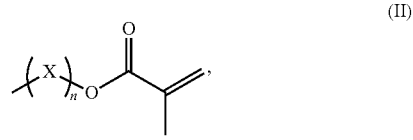

in which X represents a methylene, ethylene glycol, or propylene glycol group and n an integer with a value from 1 up to including 6, preferably 1 to including 3;

$R^2$ represents hydrogen, a straight-chained or branched, optionally substituted $C_1$-$C_6$-alkyl group, preferably $C_1$-$C_2$-alkyl group, or a $C_1$-$C_6$-alkoxy group, preferably $C_1$-$C_2$-alkoxy group, or comprises together with $R^3$ a optionally substituted five or six-membered aliphatic ring, which optionally includes heteroatoms in or at the ring;

or the general formula (III)

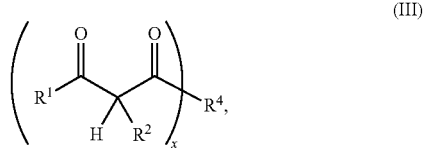

in which $R^4$ represents a bivalent or polyvalent alcohol (hereinafter also called polyol compound), x represents a number from 1 to 6, and $R^1$ and $R^2$ represent the same substances as defined above, with $R^1$ particularly preferred representing a methyl group and $R^2$ particularly preferred hydrogen.

Suitable bivalent or polyvalent alcohols comprise, for example, alkandioles, alkylene glycols, such as ethylene glycol or propylene glycol, glycerols, sugars, pentaerythritols, polyvalent derivatives or mixtures thereof. Some examples for polyvalent alcohols are neopentyl glycol, trimethylol propane, ethylene glycol, and polyethylene glycol, propylene glycol and polypropylene glycol, butandiol, pentandiol, hexandiol, tricyclodecandimethylol, 2,2,4-trimethyl-1,3-pentandiol, bisphenol A, cyclohexandi methanol, castor oil, as well as their alkoxylated and/or propoxylated derivatives.

In another embodiment of the invention the compound with the formula (III) is selected from acetoacetates with optionally mono or poly-ethoxylated and propoxylated diols, triols, and polyols, such as for example ethylene glycol monoaceto-acetate, ethylene glycol diaceto-acetate, 1,2-propandiol monoaceto-acetate, 1,2-propandiol diaceto-acetate, 1,3-propandiol monoaceto-acetate, 1,3-propandiol diaceto-acetate, 1,4-butandiol monoaceto-acetate, 1,4-butandiol diaceto-acetate, 1,6-hexandiol monoaceto-acetate, 1,6-hexandiol diaceto-acetate, neopentyl glycol monoaceto-acetate, neopentyl glycol diaceto-acetate, tyrimethylol propane monoaceto-acetate, trimethylol propane diaceto-acetate, or trimethylol propane triaceto-acetate, glycerin monoaceto-acetate, glycerin diaceto-acetate, glycerin triaceto-acetate, pentaerythritol diaceto-acetate, pentaerythritol monoaceto-erythritol, pentaerythritol biaceto-acetate, pentaerythritol triaceto-acetate, pentaerythritol tetraaceto-acetate, dipentaerythritol monoaceto-acetate, dipenta erythritol diaceto-acetate, dipenta erythritol triaceto-acetate, dipenta erythritol tertaaceto-acetate, di pentaeryth ritol pentaaceto-acetate, or di pentaeryth ritol hexaaceto-acetate.

In one embodiment the compound of the formula (I) represents a compound with the formula (IV)

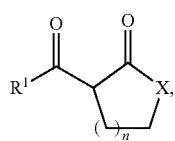

in which n represents 1, 2, or 3, preferably 1 or 2, and X represents O, S, or $NR^5$, preferably O, in which $R^5$ represents hydrogen or a optionally substituted alkyl, cycloalkyl, aryl, or aralkyl group.

Preferably in the formula (IV) n represents 1, X represents O, and $R^1$ represents $OR^6$, in which $R^6$ represents a optionally substituted alkyl group, particularly preferred a methyl group. Especially preferred the compound with the formula (IV) represents α-acetyl-γ-butyrol acetone (ABL).

In a particularly preferred embodiment of the invention at least one reactive diluent is selected from the group consisting acetyl acetone, 2-(acetoacetoxy)ethyl methacrylate, triaceto-acetato-trimethylol propane, benzylaceto-acetate, α-acetyl-γ-butyrolactone, tert-butylaceto-acetate, and ethyl-aceto-actate.

The 1,3-dicarbonyl compound is preferably added to the resin mixture at a rate of 1 to 15% by weight, more preferred from 6 to 10% by weight.

According to the invention, the inhibitor is selected from stable N-oxyl radicals or 4-hydroxy-3,5-di-tert-butyl toluene.

According to the invention, compounds as described in DE 199 56 509 A1 may be used as N-oxyl radicals (here equivalently also called nitroxyl radicals). Suitably stable N-oxyl radicals may be selected from 1-oxyl-2,2,6,6-tetramethyl piperidine, 1-oxyl-2,2,6,6-tetramethyl piperidine-4-ol (also called TEMPOL), 1-oxyl-2,2,6,6-tetramethyl piperidine-4-on (also called TEMPON), 1-oxyl-2,2,6,6-tetramethyl-4-carboxyl-piperidine (also called 4-carboxy-TEMPO), 1-oxyl-2,2,5,5-tetramethyl pyrrolidine, 1-oxyl-2,2,5,5-tetramethyl-3-carboxyl pyrrolidine (also called 3-carboxy PROXYL), aluminum-N-nitrosophenyl hydroxylamine, diethyl hydroxylamine. Other suitable nictroxyl radicals are oximes, such as acetaldoxim, acetonoxim, methyl ethyl ketoxim, salicyloxim, benzoxim, glyoxim, dimethyl glyoxim, acetone-O-(benzyloxy carbonyl)oxim, or indolin-nitroxyl radicals, such as 2,3-dihydro-2,2-diphenyl-3-(phenylimino)-1H-indol-oxyl nitroxide, or β-phosphorylated nitroxyl radicals, such as 1-(diethoxy phosphinyl)-2,2-dimethyl propyl-1,1-dimethyl methyl nictroxide, and the like. In this context reference is made to DE 199 56 509 A1, with its content hereby being included in the application. N-oxyl-radicals may be used by themselves or in mixtures.

In a preferred embodiment of the invention the polymerization inhibitor is selected from the group consisting piperidinyl-N-oxyl, tetrahydropyrrol-N-oxyl, indolin-N-oxyl, β-phosphorylated N-oxyl-radicals, and 4-hydroxy-3,5-di-tert-butyl toluene.

The inhibitor is preferably added to the resin mixture at a rate from 0.005 to 2% by weight, more preferred from 0.05 to 1% by weight.

According to the invention the 1,3-dicarboxynl compound is present in excess in reference to the polymerization inhibitor, with the weight ratio of at least one 1,3-dicarbonyl compound and the polymerization inhibitor amounting from 30:1 to 150:1, preferably from 50:1 to 150:1, particularly preferred from 75:1 to 135:1.

According to the invention, suited as compounds that can be radically polymerized are ethylenated unsaturated compound, compounds with carbon-carbon triple bonds, and thiol-Yn/En resins known to one trained in the art.

Among these compounds the group of the ethylenated unsaturated compounds is preferred, the styrenes and derivatives thereof, comprising (meth)actrylates, vinyl esters, unsaturated polyesters, vinyl ethers, allyl ethers, itaconates, dicyclo pentadiene compounds, and unsaturated fats, with particularly unsaturated polyester resins and vinyl ester resins being suitable, and described for example in the publications EP 1 935 860 A1, DE 195 31 649 A1, WO 02/051903 A1, and WO 10/108939 A1. Vinyl ester resins are most preferred, due to their hydrolytic stability and excellent mechanic features.

Examples of suitable unsaturated polyesters, which may be used in the resin mixture according to the invention, are allocated to the following categories, as classified by M. Malik et al. in J. M. S.—Rev. Macromol. Chem. Phys., C40(2 and 3), p. 139-165 (2000):

(1) Ortho-resins: they are based on phthalic acid anhydride, maleic acid anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol, or hydrogenated bisphenol-A;

(2) Iso-resins: they are made from isophthalic acid, maleic acid anhydride, or fumaric acid and glycols. These resins may show higher rates of reactive diluents than the ortho-resins.

(3) Bisphenol-A-fumarate: they are based on ethoxylated bisphenol-A and fumaric acid.

(4) HET-acid resins (hexachloro-endo-methylene-tetrahydrophthalic acid resins): they represent resins yielded from chlorine/bromine containing anhydrides or phenolene during the production of unsaturated polyester resins.

In addition to these resin classes, also the so-called dicyclo-pentadiene-resins (DCPD-resins) may be distinguished as unsaturated polyester resins. The class of the DCPD-resins is yielded either by a modification of one of the above-mentioned resin types using a Diels-Alder reaction with cyclo-pentadiene, or they are alternatively yielded by a first reaction of a dicarboxylic acid, e.g., maleic acid, with dicyclophentadienyl and subsequently by a second reaction, the common production of an unsaturated polyester resin, with the latter being called a DCPD-maleate resin.

The unsaturated polyester resin shows preferably a molar weight Mn ranging from 500 to 10,000 Dalton, more preferred ranging from 500 to 5,000, and even further preferred ranging from 750 to 4,000 (according to ISO 13885-1). The unsaturated polyester resin shows an acid value ranging from 0 to 80 mg KOH/g resin, preferably ranging from 5 to 70 mg KOH/g resin (according to ISO 2114-2000). Is a DCPD-resin used as the unsaturated polyester resin, the acid value preferably ranges from 0 to 50 mg KOH/g resin.

In the sense of the invention, vinyl ester resins include oligomers, prepolymers, or polymers with at least one (meth)acrylate end group, so-called (meth)acrylate functionalized resins, which also include urethane(meth)acrylate resins and epoxy(meth)acrylates.

Vinyl ester resins showing only unsaturated groups in the end position are for example yielded by converting epoxy-oligomers or polymers (e.g., bisphenol-A-diglycidyl ether, epoxides of the phenol-novolak type, or epoxide oligomers based on tetrabromobisphenol A) with for example (meth) acrylic acid or (meth)acrylamide. Preferred vinyl resins are (meth)acrylate functionalized resins and resins obtained by the conversion of an epoxide oligomer or polymer with methacrylic acid or methacrylamide, preferably with methacrylic acid. Examples of such compounds are also known from the publications U.S. Pat. No. 3,297,745 A, U.S. Pat. No. 3,772,404 A, U.S. Pat. No. 4,618,658 A, GB 2 217 722 A1, DE 37 44 390 A1, and DE 41 31 457 A1.

Particularly suited vinyl ester resins and preferred here are (meth)acrylate functionalized resins, e.g., yielded by converting di-functional and/or multifunctional isocyanates with suitable acryl compounds, optionally with the help of hydroxyl compounds, which comprise at least two hydroxyl groups, as described for example in DE 3940309 A1.

Aliphatic (cyclical or linear) and/or aromatic bifunctional or multifunctional isocyanates and/or pre-polymers thereof may be used as isocyanates. The use of such compounds serves to increase the wettability and thus to improve the adhesive features. Preferred are here aromatic difunctional or multifunctional isocyanates and/or pre-polymers thereof, with aromatic difunctional or multifunctional pre-polymers being particularly preferred. For example, toluylene diisocyanate (TDI), diisocyanatodipheyl methane (MDI), and polymer diisocyanatodiphenyl methane (pMDI) are named to increase the chain stiffening and hexandiisocyanate (HDI) and isophorondiisocyanate (IPDI), which improve flexibility, with here polymer diisocyanatodiphenyl methane (pMDI) being particularly preferred.

Suitable acryl compounds are acrylic acid and acrylic acids substituted at the carbon moiety, such as methacrylic acid, hydroxyl-group containing esters of the acrylic and methacrylic acid with polyvalent alcohols, pentaerythrite-tri (meth)acrylate, glycerol di(meth)acrylate, such as trimethylol propandi(meth)acrylate, neopentyl glycol mono(meth) acrylate.

Preferred are acrylic and/or methacrylic acid hydroxyl alkyl esters, such as hydroxyl ethyl(methyl)acrylate, hydroxyl propyl(meth)acrylate, polyoxy ethylene (meth) acrylate, polyoxy propylene(meth)acrylate, particularly since such compounds serve for the steric inhibition of the saponification reaction.

Suitable hydroxyl compounds that potentially may be used are bivalent or polyvalent alcohols, such as successor products of the ethylene and/or propylene oxide, such as ethandiol, diethylene glycol or triethylene glycol, propandiol, dipropylene glycol, other diols, such as 1,4-butandiol, 1,6-hexandiol, neopentyl glycol, diethanolamine, further bisphenol A and/or F and/or their ethoxy/propoxylation and/or hydration and/or halogenation products, polyvalent alcohols, such as glycerin, trimethylol propane, hexantriol, and pentaerythrite, hydroxyl-group containing polyethers, for example oligomers of aliphatic or aromatic oxiranes and/or higher cyclical ethers, such as ethylene oxide, propylene oxide, styroloxide, and furans, polyether comprising aromatic structures in the primary chain, such as bisphenol A and/or F, hydroxyl-group comprising polyesters based on the above-mentioned alcohols and/or polyether and dicarboxylic acids, and/or their anhydrides, such as adipinic acid, phthalic acid, tetra and/or hexa-hydrophthalic acid, chlorendic acid, maleic acid, fumaric acid, itaconic acid, sebacinic acid, and the like. Particularly preferred are hydroxyl compounds with aromatic structures for chain stiffening of the resin, hydroxyl compounds comprising unsaturated structures, such as fumaric acid, for increasing the density of cross-linking, branched and/or stellar hydroxyl compounds, particularly trivalent or polyvalent alcohols and/or polyethers and/or polyesters comprising these structures, branched and/or stellar urethane(meth)acrylates for yielding lower viscosity of the resins and/or their solutions in reactive diluents and higher reactivity and density of cross-linking.

The vinyl ester resin preferably shows a molar weight Mn ranging from 500 to 3,000 Dalton, more preferred from 500 to 1,500 Dalton (according to ISO 13885-1). The vinyl ester resin shows an acid value ranging from 0 to 50 mg KOH/g resin, preferably ranging from 0 to 30 mg KOH/g resin (according to ISO 2114-2000).

All these resins, which can be used according to the invention, may be modified according to methods known to one trained in the art, in order for example to yield lower acid numbers, hydroxide numbers, or anhydride numbers, or can be made more flexible by inserting flexible units into the base structure, and the like.

Furthermore, the resin may also include other reactive groups, which can be polymerized with a radical initiator, such as peroxides, for example reactive groups derived from the itaconic acid, citraconic acid, and allylic groups and the like.

In one embodiment of the invention the composition comprises additional low-viscous compounds that can be radically polymerized as reactive diluents for the compound that can be radically polymerized in order to adjust the degree of cross-linking of the resin and/or its viscosity, if necessary.

Suitable reactive diluents are described in the publications EP 1 935 860 A1 and DE 195 31 649 A1. Preferably the resin mixture includes as a reactive diluent a (meth)acrylic acid ester, with particularly preferred (meth)acrylic acid ester being selected from the group consisting of hydroxyl propyl (meth)acrylate, propandiol-1,3-di(meth)acrylate, butandiol-1,2-di(meth)acrylate, tri-methylol propane tri(meth)acrylate, 2-ethyl hexyl(meth)acrylate, phenyl ethyl-(meth)acrylate, tetrahydrofurfuryl(meth)acrylate, ethyl tri-glycol(meth) acrylate, N,N-di-methyl amino ethyl(meth)acrylate, N,N-di-methyl amino methyl(meth)acrylate, butandiol-1,4-di(meth) acrylate, ethandiol-1,2-di(meth)acrylate, isobornyl(meth) acrylate, diethylene glycol di(meth)acrylate, methoxy polyethylene glycol mono(meth)acrylate, tri-methyl cyclo hexyl(meth)acrylate, 2-hydroxy ethyl(meth)acrylate, di-cyclo pentenyloxy ethyl(meth)acrylate, and/or tri-cyclopentadienyl di(meth)acrylate, bisphenol-A-(meth)acrylate, novolak epoxy di(meth)acrylate, di-[(meth)acryloyl-maleoyl]-tricyclo-5.2.1.0.$^{2,6}$-decane, di-cyclo pentenyloxy ethyl crotonate, 3-(meth)acryloyl-oxymethyl-tricyclo-5.2.1.0.$^{2,6}$-decane, 3-(meth)cyclo pentadienyl(meth)acrylate, isobormyl(meth)acrylate, and decalyl-2-(meth)acrylate.

In general, other common compounds that can be radically polymerized may be used alone or in mixtures with the (meth)acrylic acid esters, e.g., styrene, α-methyl styrene (2-phenyl-1-propene), alkylated styrenes, such as tert-butyl styrene, divinyl benzene, and allyl compounds.

The other reactive diluents are added to the resin mixture preferably in an amount of from 20 to 50% by weight, depending on the desired viscosity of the resin mixture. The viscosity of the resin mixture is adjusted with the other reactive diluent and/or the other reactive diluents.

In addition to the inhibitors yielded according to the invention the resin mixture may also include other inhibitors in lower volumes, essentially for the purpose stable storage of the compounds that can be radically polymerized and thus also the resin mixture and a reaction resin mortar comprising it. They may be inserted either prior to the production of the compound that can be radically polymerized or the reactive diluents or added during the formulation of the resin mixture.

Commonly used inhibitors for compounds that can be radically polymerized known to one trained in the art may also be used as additional inhibitors. It is preferred that the inhibitors are selected from phenolic compounds and other non-phenolic compounds.

Potential phenolic inhibitors, which frequently represent components of commercial reaction resins that can be radically cured, are phenols, such as 2-methoxy phenol, 4-methoxy phenol, 2,6-di-tert-butyl-4-methyl phenol, 2,4-di-tert-butyl phenol, 2,6-di-tert-butyl phenol, 2,4,6-trimethyl phenol, 2,4,6-tris(dimethylamino methyl)phenol, 4,4'-thio-bis(3-methyl-6-tert-butyl phenol), 4,4'isopropyliden diphenol, 6,6'di-tert-4,4'bis(2,6-di-tert-butyl phenol), 1,3,5-trimethyl-2,4,6-tris(3,5-di-tert-butyl-4-hydroxy benzyl)benzol, 2,2'-methylene-di-p-cresol, pyrocatechol and butyl pyrocatechols, such as 4-tert-butyl pyrocatechol, 4,6-di-tert-butyl pyrocatechol, hydroquinones, such as hydroquinone, 2-methyl hydroquinone, 2-tert-butyl hydroquinone, 2,5-di-tert-butyl hydroquinone, 2,6-di-tert-butyl hydroquinone, 2,6-dimethyl hydroquinone, 2,3,5-trimethyl hydroquinone, pyroquinone, 2,3,5,6-tetrachloro-1,4-pyroquinone, methyl pyroquinone, 2,6-dimethyl pyroquinone, naphthoquinone, or mixtures of two or more thereof.

Preferably phenothiazines, such as phenothiazines and/or derivatives or combinations thereof may be used as non-phenolic substances.

Further, pyrimidinol or pyridinol compounds may be used as inhibitors in the para-position in reference to the hydroxyl group, as described in the not pre-published patent document DE 10 2011 077 248 B1.

Beneficially, a radical initiator is used as the curing agent for the compound that can be radically polymerized, in particular peroxide. In addition to the radical initiator, here an accelerator may also be used. This way rapidly curing reaction resin mortars are obtained, which are cold-curing. Beneficially the accelerant is stored separated from the curing agent and can be added to said resin mixture.

Suitable accelerants, which are commonly added to the resin mixture, are known to one trained in the art. If peroxides are used as curing agents, the accelerant may represent for example an amine, preferably a tertiary amine and/or a metal salt.

Suitable amines are selected from the following compounds, which are described for example in US 2011071234 A1: dimethylamine, trimethylamine, ethylamine, diethylamine, trimethylamine, n-propyl amine, di-n-propyl amine, tri-n-propyl amine, isopropyl amine, diisopropyl amine, triisopropyl amine, n-butyl amine, isobutyl amine, tert-butyl amine, di-n-butyl amine, diisobutyl amine, tri-isobutyl amine, pentyl amine, isopentyl amine, diisopentyl amine, hexyl amine, octyl amine, dodecyl amine, lauryl amine, stearyl amine, amino ethanol, di-ethanol amine, tri-ethanol amine, amino hexanol, ethoxy amino ethane, dimethyl-(2-chloroethyl)amine, 2-ethyl hexyl amine, bis-(2-chloroethyl) amine, 2-ethyl hexyl amine, bis-(2-ethyl hexyl)amine, N-methyl stearyl amine, dialkyl amine, ethylene diamine, N,N'-dimethyl ethylene diamine, tetramethyl ethylene diamine, diethylene triamine, permethyl diethylene triamine, triethylene tetramine, tetraethylene pentamine, 1,2-diamino propane, di-propylene triamine, tripropylene tetramine, 1,4-diamino butane, 1,6-diamino hexane, 4-amino-1-diethylamino pentane, 2,5-diamino-2,5-dimethyl hexane, trimethyl hexamethylene diamine, N,N-dimethyl amino ethanol, 2-(2-diethyl amino ethoxy)ethanol, bis-(2-hydroxy ethyl)-oleylamine, tris-[2-(2-hydroxy-ethoxy)-ethyl]amine, 3-amino-1-propanol, methyl-(3-amino propyl) ether, ethyl-(3-amino propyl)ether, 1,4-butandiol-bis(3-amino propyl ether), 3-dimethyl amino-1-propanol, 1-amino-2-propanol, 1-diethylamino-2-propanol, diisopropanol amine, methyl-bis-(2-hydroxy propyl)amine, tris-(2-hydroxy propyl)amine, 4-amino-2-butanol, 2-amino-2-methyl propanol, 2-amino-2-methyl-propandiol, 2-amino-2-hydroxy methyl propandiol, 5-aiethylamino-2-pentanon, 3-methylamino propionic acid nitrile, 6-amino hexanic acid, 11-amino undecanic acid, 6-amino hexanic acid ethyl ester, 11-amino hexanic acid-isopropyl ester, cyclohexyl amine, N-methyl cyclohexyl amine, N,N-dimethyl cyclohexyl amine, dicyclo hexyl amine, N-ethyl cyclohexyl amine, N-(2-hydroxy ethyl)-cyclohexyl amine, N,N-bis-(2-hydroethyl)-cyclohexyl amine, N-(3-amino propyl)-cyclohexyl amine, amino methyl cyclohexane, hexahydro toluidine, hexahydro benzyl amine, aniline, N-methyl aniline, N,N-dimethyl aniline, N,N-diethyl aniline, N,N-di-propyl aniline, iso-butyl aniline, toluidine, diphenylamine, hydroxy ethyl aniline, bis-(hydroxyl ethyl)aniline, chloroaniline, amino phenols, amino benzoic acids and their esters, benzyl amine, di-benzyl amine, tri-benzyl amine, methyl di-benzyl amine, α-phenyl ethyl amine, xylidine, diisopropyl aniline, dodecyl aniline, amino naphthaline, N-methyl amino naphpthaline, N,N-dimethyl amino naphthaline, N,N-dibenzyl naphthaline, di-aminocyclo hexane, 4,4'-diamino-dicyclo hexyl methane, diamino dimethyl dicyclo hexyl methane, phenylene diamine, xylylene diamine, diamino biphenyl, naphthaline diamine, toluidine, benzidine, 2,2-bis-(amino phenyl)-propane, amino anisole, amino-thio phenols, amino di-phenyl ether, amino cresols, morpholine, N-methyl morpholine, N-phenyl morpholine, hydroxyl ethyl morpholine, N-methyl pyrrolidine, pyrrolidine, piperidine, hydroxyl ethyl piperidine, pyrrole, pyridine, quinolone, indole, indolenine, carbazole, pyrazole, imidazole, thiazol, pyrimidine, quinoxaline, amino morpholine, dimorpholine ethane, [2,2,2]-diazabicyclo octane, and N,N-dimethyl-p-toluidine.

Preferred amines are aniline derivatives and N,N-bis-alkyl aryl amines, such as N,N-dimethyl aniline, N,N-diethyl aniline, N,N-dimethyl-p-toluidine, N,N-bis(hydroxyl alkyl)amine, N,N-bis(2-hydroxy ethyl)aniline, N,N-bis(2-hydroxy ethyl)toluidine, N,N-bis(2-hydroxy propyl) aniline, N,N-bis(2-hydroxy propyl)toluidine, N,N-bis(3-methacryloyl-2-hydroxy propyl)-p-toluidine, N,N-dibutoxy hydroxyl propyl-p-toluidine, and 4,4'-bis(dimethyl amino) diphenyl methane, as well as their ethoxylated and/or propoxylated derivatives.

Polymer amines as the ones obtained by poly-condensation of N,N-bis(hydroxyl alkyl)aniline with dicarboxylic acids or by poly-addition of ethylene oxide to these amines are also suitable accelerants.

Suitable metal salts are for example cobalt octoate or cobalt naphthenoate, as well as iron, vanadium, potassium, calcium, copper, manganese, or zirconium carboxylates.

If an accelerant is used, it shall be used at an amount from 0.2 to 3% by weight, preferably 0.3 to 2% by weight in reference to the resin mixture.

In one embodiment the resin mixture may additionally include an adhesive agent. By the use of an adhesive agent the cross-linking of the wall of the borehole with the dowel matter is improved so that the adhesion in promoted in the cured state. This is important for the use of the two-component dowel mass e.g., in the diamond-drilled boreholes and increases the load values. Suitable adhesive agents are selected from the group of the silanes, which are functionalized with other reactive organic groups and can be integrated in the polymer cross-links, and particularly show groups that can be hydrolyzed. To this regard, reference is made to the publication DE 10 2009 059 210 A1, with its content hereby being included in the application.

The inventors could further determine that the viscosity of the resin mixture is of considerable influence upon the strength of the mortar mass comprising the resin mixture according to the invention.

Here the load values increase with rising viscosity, with the viscosity however being limited such that, after the formulation of a two-component of poly-component system, the substance still needs to be pliable. In particular, it must be possible to apply the substances via a manual dispenser.

A preferred range for the viscosity of the resin mixture, in which the influence upon the load values could be observed, has shown to range from 200 to 800 mPa, preferably from 300 to 500 mPa according to DIN EN ISO 2884 using a Rheometer RS 600 of the company Haake, Karlsruhe; measuring geometry plate/cone Ø 60 mm, 1° Titan (C60/1° Ti) gap 0.052 mm at 23° C., and a shearing speed of $150\ s^{-1}$.

As already described, the viscosity of the resin mixture according to the invention is adjusted to the desired value by the further addition of suitable reactive diluents.

Another objective of the invention is a reaction resin mortar, which in addition to the just described resin mixture also includes inorganic and/or organic aggregates, such as fillers and/or other additives.

The rate of the resin mixture in the reaction resin mortar ranges preferably from 10 to 70% by weight, more preferred from 40 to 60% by weight in reference to the reaction resin mortar.

Accordingly the rate of the aggregates ranges preferably from 90 to 30% by weight, further preferred from 60 to 40% by weight in reference to the reaction resin mortar.

Common fillers are used, preferably mineral or mineral-like fillers, such as quartz, glass, sand, quartz sand, quartz meal, china, corundum, ceramic, talcum, silicic acid (e.g., pyrogenic silic acid), silicate, clay, titanium dioxide, chalk, barite, feldspar, basalt, aluminum hydroxide, granite, or sandstone, polymer fillers, such as thermosetting plastics, hydraulically curable fillers, such as gypsum, caustic lime, or cement (e.g., clay or Portland cement), metals, such as aluminum, soot, further wood, mineral or organic fibers or the like, or mixtures of two or more thereof, which may be added as powders, in a granular form, or in shape of formed bodies.

The fillers may be present in any arbitrary form, for example as a powder or meal or as formed bodies, e.g., in the form of cylinders, rings, spheres, platelets, rods, saddle, or crystalline form, or further in a fibrous shape (fibrous fillers), and the respectively underlying parts preferably show a maximum diameter of 10 mm. Fillers are provided in the respective component preferably in an amount of up to 90, particularly 3 to 85, preferably 5 to 70% by weight.

Other potential additives are further thixotroping agents, such as optionally organically post-treated pyrogenic silicic acid, bentonite, alkyl and methyl cellulose, castor oil derivatives, or the like, plasticizers such as phthalic acid or sebacinic acid ester, stabilizers, anti-static agents, thickeners, flexibilizers, curing catalysts, rheology agents, cross-linking agents, coloring additives, such as colorants or particularly pigments, for example for the different coloration of components in order to allow a better control of their mixing status or the like, or mixtures of two or more thereof. Non-reactive diluents (solvents) may be present as well, preferably at an amount of up to 30% by weight in reference to the respective component (reaction resin mortar, hardener), for example from 1 to 20% by weight, such as low-alkyl ketones, e.g., acetone, di-low alkyl—low-alkanoyl amides, such as dimethyl acetamide, low-alkyl benzenes, such as xylene or toluene, phthalic acid ester, or paraffin, or water.

The reaction resin mortar according to the invention is particularly suited as the resin component for a mortar mass, which is suited for construction purposes. In particular, the reaction resin mortar is suitable as the resin component for a dowel masses for the chemical fastening in mineral undergrounds.

The reaction resin mortar may here be included completely in one component and essentially form said component. Alternatively the reaction resin mortar may be distributed over several, generally spatially separated components.

In order for the compound that can radically polymerize and thus also the reaction resin mortar to cure, shortly before the application a curing agent must be inserted. Preferably the component (hardener) which includes the curing agent may further comprise inorganic and/or organic aggregates, with the aggregates optionally being the same as the ones added to the reaction resin mortar as well as water or other liquid adjuvants. The aggregates usually represent fillers and/or additives. The aggregates are here used in volumes from 20 to 90% by weight, preferably from 50 to 80% by weight in reference to the curer.

The hardener is commonly contained entirely in a component which is beneficially different from the one comprising and/or containing the reaction resin mortar so that the curing agent is separated in a reaction inhibiting fashion from the compound that can radically polymerize and the other components of the reaction resin mortar which can radically polymerize. Here, the hardener also forms another component of the two-component or multi-component mortar system. The hardener may also be distributed over several components.

The component comprising the reaction resin mortar or the components comprising the reaction resin mortar, either distributed by weight or by components is/are called resin component(s). The component comprising the hardener and/or the components comprising the hardener, either distributed by weight or by components is/are called hardener component(s).

Accordingly, a mortar system with two or more components is another object of the invention, comprising one of the above-described reaction resin mortar and a hardener separated therefrom in a reaction inhibiting fashion, which comprises a curing agent and inorganic and/or organic aggregates.

Preferably the mortar system is designed as a two-component mortar system, with one component comprising the reaction resin mortar (resin component) and the other component the hardener (hardener component). The two components are beneficially arranged separated from each other in a reaction-inhibiting fashion.

Preferably the curing is initiated with inorganic or organic peroxide as the curing agent. Here, all peroxides known to one trained in the art may be used, which are used for curing unsaturated polyester resins and vinyl ester resins. Such peroxides include organic or inorganic peroxides, either in a liquid or solid form, with hydrogen peroxide potentially being used. Examples of suitable peroxides are peroxy carbonate (with the formula —OC(O)O—), peroxy ester (with the formula —C(O)OO—), diacyl peroxide (with the formula —C(O)OOC(O)—), dialkyl peroxide (with the formula —OO—), and the like. They may be present as oligomers or polymers. A comprehensive series of examples for suitable peroxides is described for example in the application US 2002/0091214 A1, paragraph [0018].

Preferably the peroxides are selected from the group of organic peroxides. Suitable organic peroxides are: tertiary alkyl hydro-peroxides, such as tert-butyl hydro-peroxide, and other hydro-peroxides, such as cumene hydro-peroxide, peroxy-ester, or peracids, such as tert-butyl perester, benzoyl peroxide, peracetate, and perbenzoate, lauryl peroxide, including (di)peroxy-ester, perester, such as peroxy diethyl ester, perketone, such as methyl ethyl ketone peroxide. The organic peroxides used as curers are frequently tertiary peresters or tertiary hydro-peroxides, i.e. peroxide compounds with tertiary carbon atoms, which are bonded directly to the —O—O-acyl or —OOH-group. However, mixtures of these peroxides with other peroxides may also be used according to the invention. The peroxides may also be mixed peroxides, i.e. peroxides, which show two different peroxide-carrying units in one molecule. Preferably benzoyl-peroxide (BPO) is used for curing.

Beneficially, in the two-component or multi-component mortar system according to the invention the hardener component may comprise peroxide in an amount of from 0.1 to 3% by weight and preferably from 0.25 to 2% by weight, in reference to the total weight of the two-component or multi-component mortar system, i.e. the reaction resin mortar and the hardener.

When the curing of the compound that can be radically polymerized is promoted with an accelerant, said accelerant is beneficially added to the reaction resin mortar. In the two-component or multi-component mortar system the reaction resin mortar may comprise the accelerant at an amount of from 0.1 to 1.5% by weight and preferably from 0.25 to 1.0% by weight in reference to the total weight of the two-component or multi-component mortar system.

The reaction resin mortar beneficially includes also an inhibitor. In the two-component or multi-component mortar system the reaction resin mortar may comprise the inhibitor at an amount of from 0.003 to 0.35% by weight and preferably from 0.01 to 0.2% by weight in reference to the total weight of the two-component or multi-component mortar system. Here, it must be considered that the additional inhibitors, potentially contained in the resin master batch and/or added for the stabilization of the resin mixture, must be considered when calculating the volume, so that the total volume of inhibitors is within the range stated.

Conventional mortar masses include, in reference to the total weight of reaction resin mortar and hardener, 1.5 to 3% by weight curing agent, preferably a peroxide and particularly preferred dibenoyl peroxide (BPO). Depending on the mixing ratio the hardener must here comprise 7 to 15% of the peroxide. This leads to a characterization of the hardener as "sensitizing". Hardeners with a BPO-content below 1% are not subject to labeling.

In the event that according to a preferred embodiment of the two-component or multi-component mortar system a system shall be provided and formulated with such a low concentration of peroxide, the concentrations at the accelerant and the inhibitor must be considerably reduced. They range for the accelerant from 0.1 to 0.5% by weight and for the inhibitor from 0.003 to 0.07% by weight. Here, the volumes stated "% by weight" are referenced to the total weight of the two-component or multi-component mortar system.

Accordingly, a preferred embodiment of the invention relates to a two-component or multi-component mortar system, with the accelerant being included in an amount of from 0.1 to 0.5% by weight, the inhibitor at an amount of from 0.003 to 0.07% by weight, and the curing agent at an amount of from 0.1 to 0.35% by weight, each in reference to the total weight of the two-component or multi-component mortar system.

This way, for example at a peroxide content of 0.25% by weight, in reference to the total weight of the reaction resin mortar and the hardener, at a mixing ratio of the reaction resin mortar to the hardener amounting to 3:1 weight parts and at an inhibitor content of 0.07% by weight here, by a variation of the content volume of the accelerant from 0.35% by weight ±25%, gel times can be adjusted from 2.5 to 6 minutes at 25° C.

Here, it has shown that the two-component or multi-component mortar of the type in question, at a concentration of the accelerant showing more than 0.5% by weight and at the stated peroxide concentration of 0.25% by weight, the above-mentioned gel time could not be adjusted with inhibitors, because the increased concentrations of inhibitors required therefore fail to securely cure.

However, it is possible with the two-component or multi-component mortar mass according to the invention to avoid not only the labels of the peroxide content but also to provide a mortar mass, which at a wide range of mixing ratios of reaction resin mortar to hardener from 3:1 to 5:1 parts by weight achieves good curing features and high load values at a sufficiently long processing period.

In a preferred embodiment of the two-component mortar system the resin component includes, in addition to the reaction resin mortar, also a hydraulically bonding or potentially polycondensing, inorganic compound and the curing component also includes water, in addition to the curing agent. Such mortar masses are described in detail in DE 42 31 161 A1. Here, the A component preferably includes cement, for example Portland cement or aluminate cement as the hydraulically bonding or potentially polycondensing inorganic compound, with cements free from ferrous oxide or low in ferrous oxide being particularly preferred.

Gypsum per se or in a mixture with the cement may also be used as the hydraulically bonding inorganic compound. Here, silicate-based compounds that can be poly-condensed may also be used as potentially polycondensing inorganic compounds, particularly substances comprising soluble, dissolved, and/or amorphous silicon dioxide.

In a particularly preferred embodiment of the two-component mortar mass the resin component includes 8 to 25% by weight resin that can be radically polymerized, 8 to 25% by weight reactive diluent, 0.1 to 0.5% by weight accelerant, and 0.003 to 0.07% by weight inhibitor, 40 to 70% by weight filler, and 0.5 to 5% by weight thickening agent, and the hardener component may comprise 0.1 to 0.35% by weight peroxide, 3 to 15% by weight water, 5 to 25% by weight filler, and 0.1 to 3% by weight thickening agent, respectively in reference to the total weight of the two-component mortar system.

The objective of the invention further relates to the use of the two-component or multi-component mortar system for construction purposes.

In the sense of the present invention the term "for construction purposes" includes the structurally adhesion of concrete/concrete, steel/concrete, or steel/steel, or one of the above-mentioned materials on other mineral materials, the structural reinforcement of building parts made from concrete, masonry, and other mineral materials, reinforcing applications with fiber-reinforced polymers of construction objects, the chemical fastening of surfaces made from concrete, steel, or other mineral materials, particularly the chemical fastening of construction elements and anchoring means, such as anchor rods, anchor bolts, (threaded) rods, (threaded) sheaths, steel reinforced concrete, screws, and the like in boreholes in various undergrounds, such as (steel reinforced) concrete, masonry, and other mineral materials, metals (e.g., steel), ceramics, plastics, glass, and wood.

The two-component or multi-component mortar system is particularly suited for the chemical fastening of construction elements and anchoring means in mineral undergrounds, such as concrete, masonry (solid brick or massive stone masonry), hollow walls (hollow brick or ventilated brick masonry), light or porous concrete, particularly concrete and brick.

EXEMPLARY EMBODIMENTS

Examples 1 to 16 and Reference Examples V1 to V3

Resin mixtures were prepared with compositions shown in tables 1 to 4 by homogenously mixing the components with each other. Volume statements each refer to parts by weight.

For the production of reaction resin—mortar mass 50 parts by weight of the resin mixtures yielded in this manner was homogenously mixed with 4 parts by weight pyrogenic silicic acid, 15 parts by weight clay cement, and 31 parts by weight quartz sand. This way the resin component was yielded.

Used as the curing agent was a mixture comprising 1 part by weight dibenzoyl peroxide, 28 parts by weight water, 4 parts by weight pyrogenic silicic acid, 63 parts by weight quartz (0-80 μm), and 4 parts by weight clay.

The resin component and the hardener component were mixed with each other at a weight ratio of 3:1 and from the masses yielded the gel times as well as the load at break was determined in the brick masonry.

Additionally, the viscosity is determined from the masses according to the reference examples V2 and V3 as well as according to example 16.

Determination of the Gel Times of the Mortar Masses

The determination of the gel times of the mortar masses yielded in this manner occurs with a commercial device (GELNORM®-Gel timer) at a temperature of 25° C. For this purpose, the components are mixed and directly after the mixing process tempered in the silicon bath to 25° C. and the temperature of the sample is measured.

The sample itself is here located in a test tube, which is placed into an air jacket immersed in the silicon bath for the purpose of tempering.

The temperature of the sample is listed in reference to time. The evaluation occurs according to DIN16945, page 1 and DIN 16916. The pot time defines the time at which a temperature increase by 10K is achieved, here from 25° C. to 35° C.

The results of the determination of gel time are shown in the following tables 1 to 4.

Determination of the Load at Break

In order to determine the stress at which the cured mass breaks from the connection, here threaded anchor rods M10 are used, which are fastened with dowels in the boreholes in the brick wall according to EN 791-1, but with a pressure resistance of approx. 35 MPa at a diameter of 12 mm and a depth of the borehole of 80 mm using the reaction resin mortar—compositions of the examples and the reference examples. The average load at break is determined by a central extension of the threaded anchor rod. Here, respectively three threaded anchor rods are fastened via dowels and the load values are determined after 24 [sic] curing period.

The loads at break (kN) determined here are listed as mean values in the following tables 1 to 4.

Measuring the Viscosity of the Resin Mixtures

The viscosity of the resin mixtures was measured according to DIN EN ISO 2884 with a rheometer RS 600 of the company Haake, Karlsruhe, a measuring geometry plate-cone Ø 60 mm, 1° Titan (C60/1° Ti), gap 0.052 mm at a temperature of 23° C. and a shearing speed of 150 $s^{-1}$.

TABLE 1

Composition of the resin mixtures, gel times, and load at break

| Example | V1 [a] | 1 | 2 | 3 | 4 | 5 |
|---|---|---|---|---|---|---|
| UMA-resin [b] | 50 | 50 | 50 | 50 | 50 | 50 |
| Aceto-acetone | | 6 | | | | |
| Benzyl aceto-acetate | | | 8 | | | |
| 2-(methacryloyloxy)ethyl aceto-acetate | | | | 10 | | |
| Tris(aceto-acetato)-tri-methylol propane | | | | | 4 | |
| 2-acetyl-γ-butyrolacton | | | | | | 6 |
| Bis(hydroxyl ethyl)-p-toluidine | 1.5 | 1.5 | 1.5 | 1.5 | 1.5 | 1.5 |
| 4-hydroxy-TEMPO [c] | 0.11 | 0.13 | 0.13 | 0.13 | 0.12 | 0.13 |
| 1,4-butandiol-dimethacrylate | ad 100 | ad 100 | ad 100 | ad 100 | ad 100 | ad 100 |
| Weight ratio aceto-acetate:initiator | n.a. | 46 | 61.5 | 77 | 33.3 | 46 |
| Gel time @ 25° C. [min] | 4.0 | 5.0 | 5.2 | 4.2 | 5.4 | 4.2 |
| Load at break in the brick wall M10*80 mm [kN] | 12.8 | 21.7 | 17.9 | 25.8 | 22.2 | 23.6 |

[a] V = reference example
[b] Urethane methacrylate resin, produced according to DE 4111828 A1
[c] TEMPO = 2,2,6,6-tetramethyl piperidine-1-oxyl

TABLE 2

Composition of the resin mixtures, gel times, and load at break

| Example | V2 | 6 | 7 | 8 | 9 | 10 |
|---|---|---|---|---|---|---|
| UMA-resin | 50 | 50 | 50 | 50 | 50 | 50 |
| 2-(methacryloyloxy)ethyl-aceto-acetate | 10 | 10 | 10 | 10 | 10 | 10 |
| Bis(hydroxyl ethyl)p-toluidine | 1.5 | 1.5 | 1.5 | 1.5 | 1.5 | 1.5 |
| Pyrocatechol | 0.07 | | | | | |
| Inhibitor 1 [d)] | | 0.13 | | | | |
| Inhibitor 2 [e)] | | | 0.12 | | | |
| Inhibitor 3 [f)] | | | | 0.15 | | |
| Inhibitor 4 [g)] | | | | | 0.28 | |
| 4-hydroxy-3,5-di-tert-butyl toluene | | | | | | 0.07 |
| 1,4-butandiol dimethacrylate | ad 100 | ad 100 | ad 100 | ad 100 | ad 100 | ad 100 |
| Weight ratio aceto-acetate:initiator | 143 | 77 | 83 | 67 | 36 | 143 |
| Gel time @ 25° C. [min] | 4.0 | 4.2 | 3.9 | 4.5 | 4.1 | 3.6 |
| Load at break in the brick wall M10*80 mm [kN] | 14.7 | 25.8 | 25.4 | 24.6 | 31.9 | 22.7 |

[d)] 4-hydroxy-TEMPO
[e)] 4-phenacyliden-2,2,5,5-tetramethyl imidazolidine-1-yloxy
[f)] 2,3-dihydro-2,2-diphenyl-3-(phenylimino)-1H-indol-1-oxylnitroxide
[g)] 1-(diethoxy phosphinyl)-2,2-dimethyl propyl-1,1-dimethyl methyl-nitroxide

TABLE 3

Composition of the resin mixtures, gel times, and loads at break

| Example | 11 | 12 | 13 | 14 | 15 |
|---|---|---|---|---|---|
| UMA-resin | 50 | | | 50 | 50 |
| Bisphenol A glycerolate-dimethacrylate | | 50 | | | |
| Sartomer SR 348C [h)] | | | 75 | | |
| 2-(methacryloyloxy)ethyl-aceto-acetate | 10 | 8 | 8 | 8 | 2 |
| Bis(hydroxyl ethyl)-p-toluidine | 1.5 | 1.5 | 1.5 | 1.5 | 1.5 |
| 4-hydroxy-TEMPO | 0.13 | 0.08 | 0.06 | 0.14 | 0.1 |
| 1,4-butandiol dimethacrylate | ad 100 | ad 100 | ad 100 | ad 100 | ad 100 |
| Weight ratio aceto-acetate:initiator | 77 | 100 | 133 | 57 | 20 |
| Gel time @ 25° C. [min] | 4.2 | 4.7 | 4.8 | 4.6 | 4.4 |
| Load at break in the brick wall M10*80 mm [kN] | 25.8 | 24.3 | 26.8 | 23.4 | 20.1 |

[h)] Ethoxylated bisphenol-A-dimethacrylate

TABLE 4

Composition of the resin mixtures, gel times, and loads at break

| Example | V3 | V4 | 16 |
|---|---|---|---|
| UMA-resin | 38 | 42 | 50 |
| 2-(methacryloyloxy)ethyl-aceto-acetate | 10 | 10 | 10 |
| Bis(hydroxyl ethyl)-p-toluidine | 1.5 | 1.5 | 1.5 |
| 4-hydroxy-TEMPO | 0.11 | 0.12 | 0.13 |
| 1,4-butandiol dimethacrylate | ad 100 | ad 100 | ad 100 |
| Weight ratio aceto-acetate:initiator | 91 | 83 | 77 |
| Resin viscosity [mPas] | 154 | 224 | 350 |
| Gel time @ 25° C. [min] | 5.5 | 3.5 | 4.2 |
| Load at break in the brick wall M10*80 mm [kN] | 7.6 | 17.7 | 25.8 |

From the above-stated table it is discernible that the masses according to the invention show considerably better loads at break than the masses produced according to the reference example.

The invention claimed is:
1. A resin mixture, comprising:
at least one compound that can be radically polymerized,
at least one first polymerization inhibitor, which is selected from the group consisting of stable N-oxyl-radicals and 4-hydroxy-3,5-di-tert-butyl toluene, and
at least one first reactive diluent, which is selected from the group consisting of 1,3-dicarbonyl compounds with the formula (I)

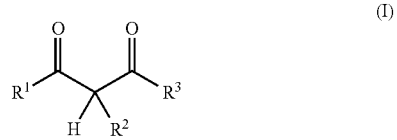

(I)

in which
$R^1$ represents a straight-chained or branched, optionally substituted $C_1$-$C_6$-alkyl group;
$R^3$ represents hydrogen or a straight-chained or branched, optionally substituted $C_1$-$C_6$-alkyl group, a $C_1$-$C_6$-alkoxy group, or a methacryloyloxy group with the formula (II)

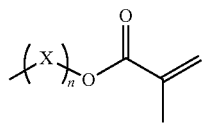

(II)

in which X represents a methylene glycol, ethylene glycol, or propylene glycol group, and n an integer with a value from 1 up to including 6, $R^2$ represents hydrogen, a straight-chained or branched, optionally substituted $C_1$-$C_6$-alkyl group or a $C_1$-$C_6$-alkoxy group, or together with $R^3$ forms an optionally substituted five or six-membered aliphatic ring, which optionally comprises heteroatoms in or at the ring;

or 1,3-dicarbonyl compounds with the general formula (III)

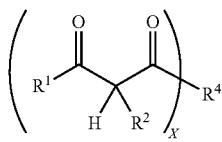

(III)

in which $R^4$ represents a bivalent or polyvalent alcohol,

X represents an integer between 1 and 6, and $R^1$ and $R^2$ are the same as defined above, wherein the ratio of at least one 1,3-dicarbonyl compound and the polymerization inhibitor ranges from 30:1 to 150:1, wherein the reactive diluent is included in an amount of from 1 to 15% by weight of the resin mixture and the at least one first polymerization inhibitor is included in an amount of from 0.005 to 2% by weight of the resin mixture, and wherein an Mn metal salt is excluded from the resin mixture, and wherein the viscosity of the resin mixture ranges from 200 to 800 mPa·s.

2. The resin mixture of claim 1, wherein the at least one reactive diluent is selected from the group consisting of acetyl acetone, 2-(aceto-acetoxy)ethyl methacrylate, tri-aceto-acetato-trimethylol-propane, benzyl-aceto-acetate, α-acetyl-γ-butyrol-actone, tert-butyl aceto-acetate, ethyl aceto-acetate and mixtures thereof.

3. The resin mixture of claim 1, wherein the polymerization inhibitor is selected from the group consisting piperidinyl-N-oxyl-tetrahydropyrrol-N-oxyl, indolin-N-oxyl, β-phosphorylated N-oxyl-radicals, 4-hydroxy-3,5-di-tert-butyl toluene and mixtures thereof.

4. The resin mixture of claim 1, wherein the compound that can be radically polymerized is selected from the group consisting of an unsaturated polyester resin, a vinyl ester resin, a urethane(meth)acrylate resin, an epoxy(meth)acrylate resin and mixtures thereof.

5. The resin mixture of claim 1, further comprising at least one accelerant.

6. The resin mixture of claim 1, further comprising a second reactive diluent and/or a second polymerization inhibitor.

7. A reaction resin mortar, comprising:

a resin mixture comprising:

at least one compound that can be radically polymerized, at least one first polymerization inhibitor, which is selected from the group consisting of stable N-oxyl-radicals and 4-hydroxy-3,5-di-tert-butyl toluene, and at least one first reactive diluent, which is selected from the group consisting of 1,3-dicarbonyl compounds with the formula (I)

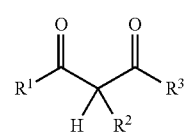

(I)

in which $R^1$ represents a straight-chained or branched, optionally substituted $C_1$-$C_6$-alkyl group;

$R^3$ represents hydrogen or a straight-chained or branched, optionally substituted $C_1$-$C_6$-alkyl group, a $C_1$-$C_6$-alkoxy group, or a methacryloyloxy group with the formula (II)

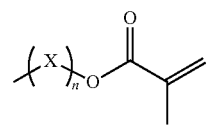

(II)

in which X represents a methylene glycol, ethylene glycol, or propylene glycol group, and n an integer with a value from 1 up to including 6, $R^2$ represents hydrogen, a straight-chained or branched, optionally substituted $C_1$-$C_6$-alkyl group or a $C_1$-$C_6$-alkoxy group, or together with $R^3$ forms an optionally substituted five or six-membered aliphatic ring, which optionally comprises heteroatoms in or at the ring;

or 1,3-dicarbonyl compounds with the general formula (III)

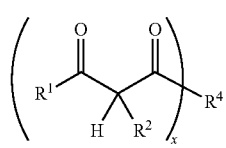

(III)

in which $R^4$ represents a bivalent or polyvalent alcohol,

X represents an integer between 1 and 6, and $R^1$ and $R^2$ are the same as defined above, wherein the ratio of at least one 1,3-dicarbonyl compound and the polymerization inhibitor ranges from 30:1 to 150:1, wherein the reactive diluent is included in an amount of from 1 to 15% by weight of the resin mixture and the at least one first polymerization inhibitor is included in an amount of from 0.005 to 2% by weight of the resin mixture, and wherein an Mn metal salt is excluded from the resin mixture, and wherein the viscosity of the resin mixture ranges from 200 to 800 mPa·s, and an inorganic and/or organic aggregate.

8. The reaction resin mortar of claim 7, comprising an inorganic filler as an aggregate, which is selected from the group consisting of quartz, sand, pyrogenic silicic acid, corundum, chalk, talcum, ceramic, clay, glass, cement, light spar, barite and mixtures thereof in a suitable distribution of particle sizes.

9. The reaction resin mortar of claim 7, comprising a thickening agent as the aggregate, which is selected from the group consisting of pyrogenic silicic acids, sheet silicates, acrylate or polyurethane thickening agents, castor oil compounds, Neuburg siliceous earth, xanthan gum and mixtures thereof.

10. A two-component or hi-component mortar system, comprising:
    a reaction resin mortar of claim 9 and separated therefrom, in a reaction inhibiting fashion,
    a hardener, comprising a curing agent and an inorganic and/or organic aggregate.

11. The two-component or multi-component mortar system of claim 10, wherein the curing agent is an inorganic or organic peroxide.

12. The two-component or multi-component mortar system of claim 10, wherein the accelerant is included in an amount of from 0.1 to 1.5% by weight, the inhibitors in an amount of from 0.003 to 0.35% by weight, and the curing agent in an amount of from 0.1 to 3% by weight, each in reference to the total weight of the two-component or multi-component mortar system.

13. The two-component or multi-component mortar system of claim 10, wherein the accelerant is included in an amount of from 0.1 to 0.5% by weight, the inhibitor in an amount of from 0.003 to 0.07% by weight, and the curing agent in an amount of from 0.1 to 0.35% by weight, each in reference to the total weight of the two-component or multi-component system.

14. A method of constructing an article, comprising:
    applying the reaction resin mortar of claim 7 comprising inorganic and/or organic aggregates and
    a resin mixture comprising:
        at least one compound that can be radically polymerized,
        at least one first polymerization inhibitor in an amount of from 0.005 to 2% by weight of the resin mixture, which is selected from the group consisting of stable N-oxyl-radicals and 4-hydroxy-3,5-di-tert-butyl toluene, and
        at least one first reactive diluent in an amount of from 1 to 15% by weight of the resin mixture, which is selected from the group consisting of 1,3-dicarbonyl compounds with the formula (I)

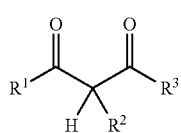

(I)

in which
R$^1$ represents a straight-chained or branched, optionally substituted C$_1$-C$_6$-alkyl group;

R$^3$ represents hydrogen or a straight-chained or branched, optionally substituted C$_1$-C$_6$-alkyl group, a C$_1$-C$_6$-alkoxy group, or a methacryloyloxy group with the formula (II)

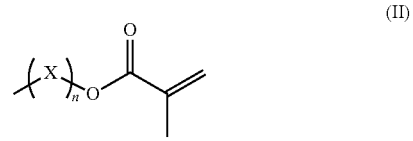

(II)

in which X represents a methylene glycol, ethylene glycol, or propylene glycol group, and n an integer with a value from 1 up to including 6, R$^2$ represents hydrogen, a straight-chained or branched, optionally substituted C$_1$-C$_6$-alkyl group or a C$_1$-C$_6$-alkoxy group, or together with R$^3$ forms a potentially substituted five or six-link aliphatic ring, which optionally includes heteroatoms in or at the ring;

or 1,3-dicarbonyl compounds with the general formula (III)

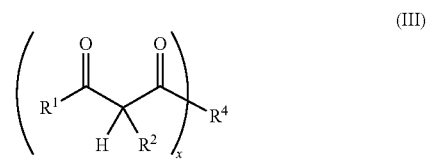

(III)

in which
R$^4$ represents a bivalent or polyvalent alcohol,
x represents an integer between 1 and 6, and
R$^1$ and R$^2$ represent the same substances as defined above, wherein the ratio of at least one 1,3-dicarbonyl compound and the polymerization inhibitor ranges from 30:1 to 150:1 to a first substrate, and applying a second substrate to the reaction resin mortar, wherein an Mn metal salt is excluded from the resin mixture, and wherein the viscosity of the resin mixture ranges from 200 to 800 mPa·s.

15. The method according to claim 14, which is suitable for the chemical fastening of a fastening and/or anchoring article in a borehole in a mineral underground.

16. The method according to claim 14, further comprising:
    curing the reaction resin mortar, thereby obtaining a cured reaction resin mortar having a load at break of from 17.9 to 31.9 kN.

17. A reaction resin mortar, comprising:
    a resin mixture comprising:
    at least one compound that can be radically polymerized,
    at least one first polymerization inhibitor, which is selected from the group consisting of stable N-oxyl-radicals and 4-hydroxy-3,5-di-tert-butyl toluene, and
    at least one first reactive diluent, which is selected from the group consisting of 1,3-dicarbonyl compounds with the formula (1)

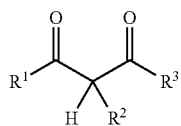 (I)

in which

R¹ represents a straight-chained or branched, optionally substituted $C_1$-$C_6$-alkyl group;

R³ represents hydrogen or a straight-chained or branched, optionally substituted $C_1$-$C_6$-alkyl group, a $C_1$-$C_6$-alkoxy group, or a methacryloyloxy group with the formula (II)

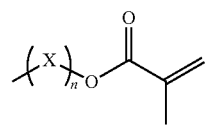 (II)

in which X represents a methylene glycol, ethylene glycol, or propylene glycol group, and n an integer with a value from 1 up to including 6, R² represents hydrogen, a straight-chained or branched, optionally substituted $C_1$-$C_6$-alkyl group or a $C_1$-$C_6$-alkoxy group, or together with R³ forms an optionally substituted five or six-membered aliphatic ring, which optionally comprises heteroatoms in or at the ring;

or 1,3-dicarbonyl compounds with the general formula (III)

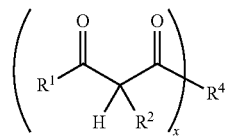 (III)

in which

R⁴ represents a bivalent or polyvalent alcohol,

X represents an integer between 1 and 6, and

R¹ and R² are the same as defined above, wherein the ratio of at least one 1,3-dicarbonyl compound and the polymerization inhibitor ranges from 30:1 to 150:1, wherein the reactive diluent is included in an amount of from 1 to 15% by weight of the resin mixture and the at least one first polymerization inhibitor is included in an amount of from 0.005 to 2% by weight of the resin mixture, and wherein an Mn accelerant is excluded from the resin mixture, and wherein the viscosity of the resin mixture ranges from 200 to 800 mPa·s, and an inorganic and/or organic aggregate.

* * * * *

UNITED STATES PATENT AND TRADEMARK OFFICE
CERTIFICATE OF CORRECTION

PATENT NO. : 10,239,787 B2
APPLICATION NO. : 15/003105
DATED : March 26, 2019
INVENTOR(S) : Thomas Burgel and Monika Monch It is certified that error appears in the above-identified patent and that said Letters Patent is hereby corrected as shown below:

On the Title Page

Item (71) Applicant:
"Hilti Aktiengesellschaft, Liechtenstein (LI)"

Should read:
--Hilti Aktiengesellschaft, Schaan (LI)--

Signed and Sealed this
Sixteenth Day of June, 2020

Andrei Iancu
*Director of the United States Patent and Trademark Office*